United States Patent
Brown et al.

(10) Patent No.: US 7,388,844 B1
(45) Date of Patent: Jun. 17, 2008

(54) METHOD AND SYSTEM FOR INITIATING A VIRTUAL PRIVATE NETWORK OVER A SHARED NETWORK ON BEHALF OF A WIRELESS TERMINAL

(75) Inventors: David Brown, Baxter Springs, KS (US); Pawan Chaturvedi, Overland Park, KS (US); Paul Taylor, Kearney, MO (US); Kevin Packingham, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1025 days.

(21) Appl. No.: 10/229,703

(22) Filed: Aug. 28, 2002

(51) Int. Cl.
*G06F 15/16* (2006.01)
*H04L 29/06* (2006.01)

(52) U.S. Cl. ............ 370/252; 370/329; 370/352; 370/390; 370/401; 709/206; 709/227; 709/250; 455/461

(58) Field of Classification Search ............ 370/310.2, 370/328–338, 342, 343, 346, 349, 252, 352, 370/390, 401; 709/206, 227, 2; 455/461
See application file for complete search history.

(56) References Cited

U.S. PATENT DOCUMENTS

| | | | |
|---|---|---|---|
| 6,151,636 A | 11/2000 | Schuster et al. | 709/247 |
| 6,205,488 B1 | 3/2001 | Casey et al. | 709/238 |
| 6,307,837 B1 * | 10/2001 | Ichikawa et al. | 370/230 |
| 6,317,838 B1 | 11/2001 | Baize | 713/201 |
| 6,332,163 B1 * | 12/2001 | Bowman-Amuah | 709/231 |
| 6,640,249 B1 * | 10/2003 | Bowman-Amuah | 709/228 |
| 6,856,676 B1 * | 2/2005 | Pirot et al. | 379/201.01 |
| 6,954,790 B2 * | 10/2005 | Forslow | 709/227 |
| 6,970,459 B1 * | 11/2005 | Meier | 370/389 |
| 6,973,057 B1 * | 12/2005 | Forslow | 370/328 |
| 6,993,360 B2 * | 1/2006 | Plahte et al. | 455/555 |
| 6,996,387 B2 * | 2/2006 | Chan | 455/301 |
| 7,024,460 B2 * | 4/2006 | Koopmas et al. | 709/206 |
| 7,072,657 B2 * | 7/2006 | Watanabe et al. | 455/439 |
| 7,099,947 B1 * | 8/2006 | Nadeau et al. | 709/229 |
| 7,155,518 B2 * | 12/2006 | Forslow | 709/227 |
| 7,254,712 B2 * | 8/2007 | Godfrey et al. | 713/176 |
| 2002/0010758 A1 * | 1/2002 | Chan | 709/218 |
| 2002/0083344 A1 * | 6/2002 | Vairavan | 713/201 |
| 2002/0112076 A1 * | 8/2002 | Rueda et al. | 709/245 |
| 2002/0133534 A1 * | 9/2002 | Forslow | 709/200 |
| 2003/0009583 A1 * | 1/2003 | Chan et al. | 709/236 |
| 2003/0120502 A1 * | 6/2003 | Robb et al. | 705/1 |
| 2003/0208602 A1 * | 11/2003 | Bhalla et al. | 709/227 |

(Continued)

OTHER PUBLICATIONS

Cisco—White Paper—IPSec, www.cisco.com/warp/public/cc/so/neso/sqso/eqso/ipsec_wp.htm, posted Nov. 21, 2000 and printed Sep. 5, 2002 (13 pages).

(Continued)

*Primary Examiner*—Edan Orgad
*Assistant Examiner*—Venkatesh Haliyur

(57) ABSTRACT

A VPN server on a radio access network may initiate a virtual private network (VPN) over a shared network, e.g., Internet, on behalf of a wireless terminal. The VPN may span the shared network, but not span the radio access network. As a result, the radio access network may be able to analyze and manipulate data sent by the wireless terminal. Additionally, the VPN may securely transport the data through the shared network.

20 Claims, 4 Drawing Sheets

U.S. PATENT DOCUMENTS

2004/0158705 A1* 8/2004 Burdett et al. .............. 713/151
2004/0193694 A1* 9/2004 Salo et al. .................. 709/216

OTHER PUBLICATIONS

"The Macara Wireless Optimization Service Node", Bytemobile: Products, www.bytemobile.com/products/index.html, printed May 16, 2002 (2 pages).

"Shasta Portfolio", Nortel Networks: Products, Services & Solutions—Shasta Portfolio, www.nortelnetworks.com/products/01/Shasta/index.html, printed May 16, 2002 (1 page).

"Guidelines for Usage of SyncML Name, Logo and Other Identifiers", Version 1.0, (8 pages), www.syncML.org.—Dec. 7, 2000.

* cited by examiner

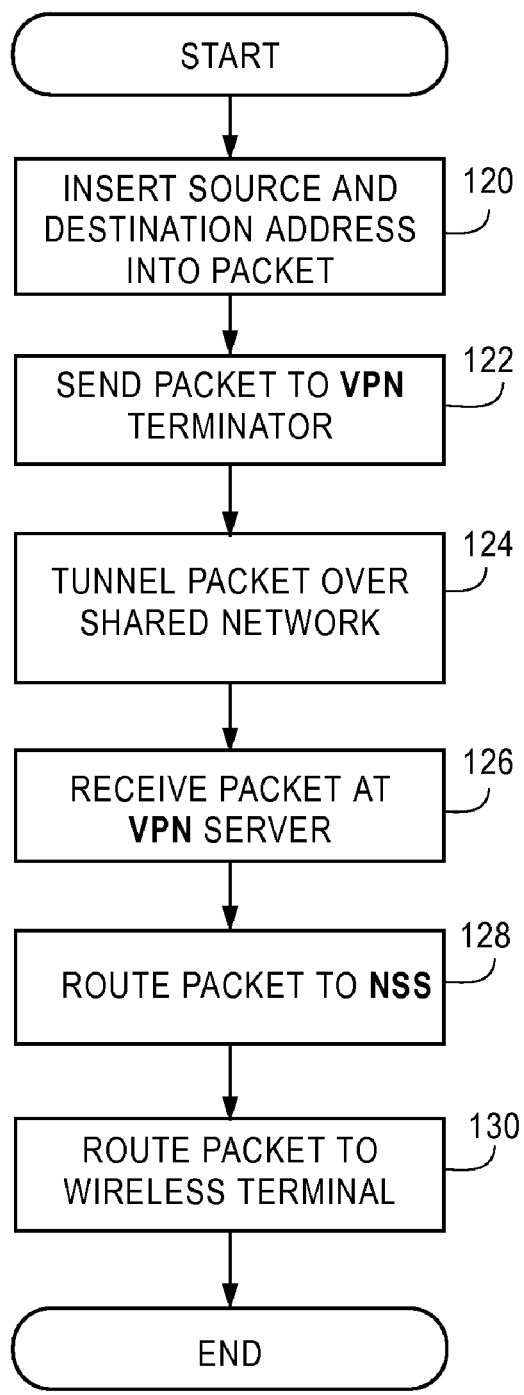

METHOD AND SYSTEM FOR INITIATING A VIRTUAL PRIVATE NETWORK OVER A SHARED NETWORK ON BEHALF OF A WIRELESS TERMINAL

BACKGROUND

1. Field of the Invention

The present invention relates to wireless communications and, more particularly, to a method and system for initiating a virtual private network over a shared network on behalf of a wireless terminal.

2. Description of Related Art

In a wireless network, a wireless terminal such as a cellular telephone or a computer with wireless modem may exchange signals with a radio access network. The radio access network may have a base transceiver station (BTS), which, in turn, communicates with a base station controller (BSC). The BSC may be coupled to a packet data serving node (PDSN) and/or a mobile switching center (MSC) and interworking function (IWF). The PDSN and the IWF may provide connectivity with a shared network, such as the Internet. The wireless terminal may communicate with a resource, such as a computer, on the shared network via the BTS, BSC, and PDSN or the BTS, BSC, MSC and IWF.

The radio access network and the shared network typically carry packets. Each of the packets is defined by a payload and a header. The payload has data, e.g., voice, video, or web content, to be transported over the radio access network and the shared network. The header has control information used by network elements on the radio access network and the shared network. The control information may include a source address and a destination address of the packet. The network elements may use the source address and the destination address to route the packet to a destination, e.g., the wireless terminal or the resource.

The wireless terminal typically initiates a virtual private network (VPN) over the radio access network and the shared network to securely transport the packets between the wireless terminal and the resource. The VPN securely transports the packets by encrypting the packets as a whole or, alternatively, encrypting the payload of the packets.

IPSec is a framework of open standards published by the Institute of Electrical and Electronic Engineers (I.E.E.E) for initiating the VPN. IPSec ensures confidentiality and integrity of data communications. IPSec provides methods for exchanging encryption/decryption keys with endpoints of the VPN, using the keys to encrypt and decrypt the payload of the packet, and adding headers to the packets. As a result, the packets can be securely transported over both the radio access network and the shared network.

The wireless terminal typically initiates the VPN so that the VPN spans both the radio access network and the shared network. The wireless terminal initiates the VPN by exchanging the encryption/decryption keys with the resource. Using the encryption key, the wireless terminal encrypts the payload of the packet. Alternatively, the wireless terminal may encrypt both the header and the payload of the packet. Then, the wireless terminal may insert the packet, as encrypted, into another packet having a source address of the wireless terminal and a destination address of the resource.

The wireless terminal sends the packet over both the radio access network and the shared network and to the resource. Network elements route the packet over both the radio access network and the shared network using the source and destination addresses in the packet. Upon receiving the packet, the resource uses the decryption key to decrypt the payload of the packet and the header of the packet, if necessary. The decryption key allow for recovering the payload of the packet as the payload existed prior to encryption.

Thus, the VPN allows for the wireless terminal to exchange packets with the resource over both the radio access network and the shared network without concern for the loss of privacy or integrity of the data in the payload.

SUMMARY

The present invention stems from a realization that data in the packets carried by a VPN is encrypted. The encryption prevents entities on the radio access network from analyzing and manipulating the data. Therefore, there exists a need for securely transmitting the packets, while allowing the entities on the radio access network to be able to analyze and manipulate the data in the packets.

In accordance with a principle aspect of the present invention, a VPN server and a VPN terminator may be coupled to a shared network. The VPN server may initiate, on behalf of a wireless terminal, a VPN that spans between the VPN server and the VPN terminator. The wireless terminal may then send data, which is compressed, to a network services server (NSS). The NSS may decompress the data and send the data to the VPN server. The VPN server may send the data to the VPN terminator, and in turn, the VPN terminator may send the data to a resource.

The VPN server may tunnel the data through the VPN. Tunneling may involve encrypting the data, inserting the data into a packet, encapsulating the packet into another packet, and sending the packet, as encrypted and encapsulated, through the VPN. The VPN may be selected in accordance with a virtual local area network identification (VLAN ID). The VLAN ID may identify the VPN over which the packet is to be tunneled so as to reach the resource. Additionally, the packet may have an enterprise IP address. The enterprise IP address may indicate that the wireless terminal is authorized to communicate with the resource.

An entity on an enterprise network may receive the packet that is tunneled through the VPN. The entity may then determine whether the enterprise IP address in the packet matches an IP address in a pool of IP addresses. If the enterprise IP address matches an address in the pool of IP addresses, then the entity may route the packet over the enterprise network to the resource. If the enterprise IP address does not match an address in the pool of IP addresses, then the entity will not route the packet over the enterprise network and to the resource.

As a result of the VPN spanning the shared network, but not spanning the radio access network, the network services suite (NSS) may be able to provide value-added services to the wireless terminal. The value-added services may include the decompression services, as already noted, as well as transcoding, synchronization, and location determination services. Of course, the NSS may provide other value-added services in addition to those describe herein.

The decompression services may include decompressing the data prior to the packets being sent over the shared network. The NSS is not limited in the data types that are decompressed and the decompression algorithms that are used.

The transcoding services may include converting the data carried by the packets from one format into another format. The NSS may convert the data to be compatible with a recipient of the packet. For example, the NSS may reduce a resolution of an image defined by the data so that the resolution is compatible with a display device which will display the image. Alternatively, the NSS may convert web content in wireless markup language into web content in hyper-text markup language to facilitate display of the web content on the resource. Again, the NSS is not limited by the formats in which the data is converted.

The synchronization services may allow for the wireless terminal and the resource to synchronize data. The NSS may use synchronization markup language (SyncML) data synchronization protocol to synchronize the data. Sync ML data synchronization protocol is an open industry standard (the entirety of which is herein incorporated by reference) for synchronizing data between networked devices. Of course, the NSS may use other types of synchronization protocols.

The NSS may also provide location determination services. The location determination services may involve the NSS determining a location of the wireless terminal. Again, by way of example, the TIA/EIA/IS-801 and TIA/EIA/J-STD-036 standards, the entirety of which is herein incorporated by reference, describe various methods for determining mobile terminal position coordinates.

These as well as other aspects and advantages of the exemplary embodiments will become apparent to those of ordinary skill in the art by reading the following detailed description, with appropriate reference to the drawings.

BRIEF DESCRIPTION OF FIGURES

Exemplary embodiments of the present invention are described herein with reference to the drawings, in which:

FIG. 4 is a flow chart for sending packets from the resource, through the VPN, and to the wireless terminal.

DETAILED DESCRIPTION OF EXEMPLARY EMBODIMENTS

Figure 1:
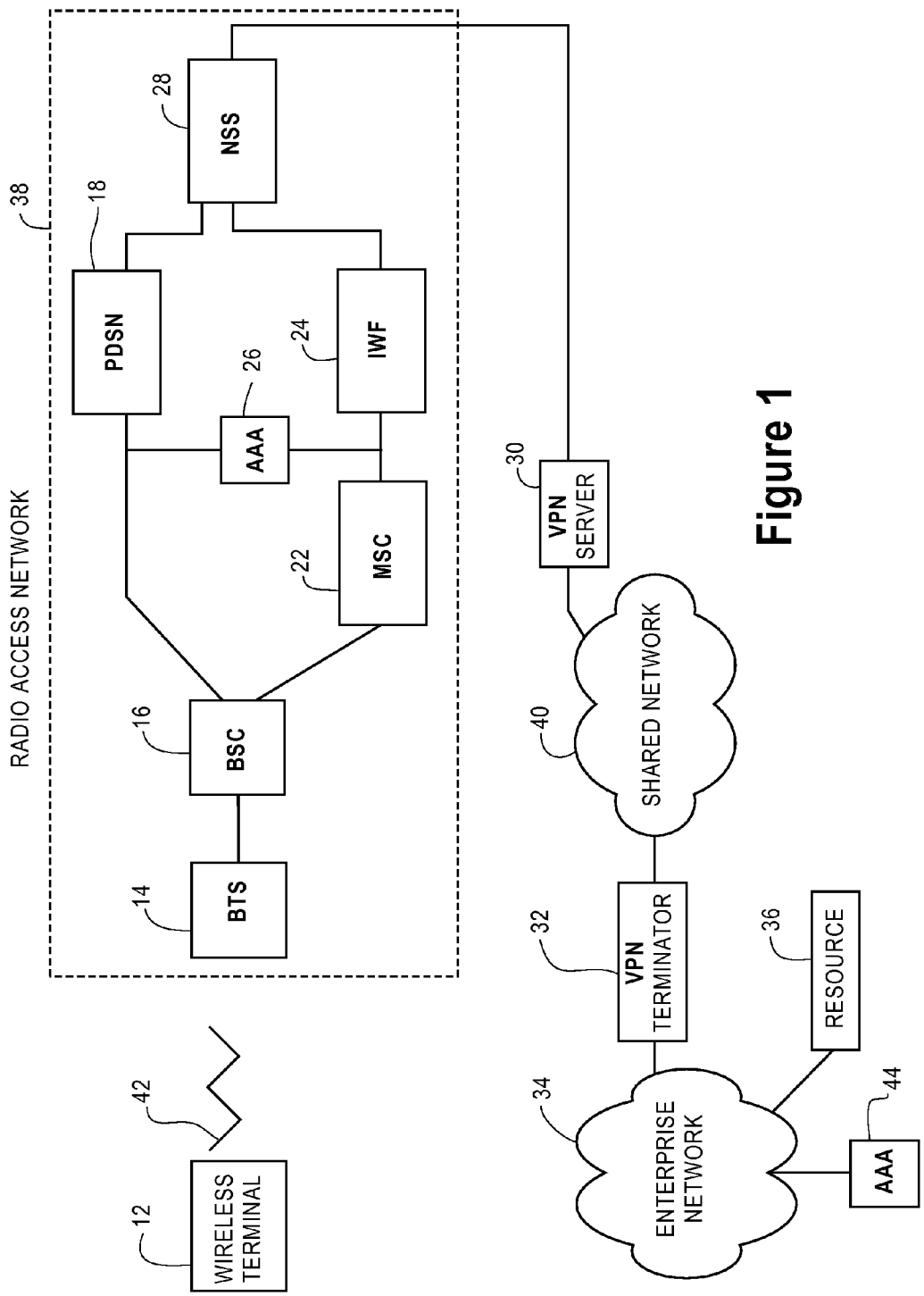
FIG. 1 is a block diagram illustrating a wireless network architecture in which exemplary embodiments of the present invention may be employed.

FIG. 1 is a block diagram of a wireless network architecture in which exemplary embodiments of the present invention may be employed. It should be understood that this and other arrangements and elements (e.g., machines, interfaces, functions, orders of elements, etc.) can be added or used instead and some elements may be omitted altogether. As in most telecommunications applications, those skilled in the art will appreciate that many of the elements described herein are functional entities that may be implemented as discrete components or in conjunction with other components, in any suitable combination and location. Moreover, the various functions described herein as being performed by one or more entities may be carried out by a processor programmed to execute an appropriate set of computer instructions stored in memory. Provided with the present disclosure, those skilled in the art can readily prepare the appropriate set of computer instructions (e.g., software) to perform such functions.

The wireless network architecture may include a wireless terminal 12 that is communicatively coupled to a resource 36. The wireless terminal 12 may be a cellular telephone or a computer with wireless modem. The resource 36 may be a wired or wireless device such as a server or a computer with wireless modem. Of course, the wireless terminal 12 and the resource 36 may take a variety of other forms.

The wireless terminal 12 may communicate with the resource 36 over a radio access network 38, a shared network 40, and an enterprise network 34. The radio access network 38 may be a wireless network that provides wireless connectivity with the wireless terminal 12. The shared network 40 may be a public network, such as the Internet. The enterprise network 34 may be a private network such as a local area network (LAN) or a wide area network (WAN).

The radio access network 38 may take a variety of forms. By way of example, the radio access network 38 may have a BTS 14 that exchanges data with the wireless terminal 12 over an air interface 42. The BTS 14 may be coupled to a BSC 16, which, in combination, allows for the wireless terminal 12 to send and receive data with an MSC 22 and an IWF 24 (i.e., 2G network elements) or a PDSN 18 (i.e., 3G network elements). The IWF 24 may format the data received from the wireless terminal 12 into packets and route the packets over the shared network 40. In contrast, the PDSN 18 may receive data from the wireless terminal 12 as packets. The PDSN 18 may route the packets to the shared network 40 and vice-versa. Other arrangements are also possible.

An authorization, authentication, and accounting (AAA) server 26 may be coupled to the IWF 24 and/or the PDSN 18. The AAA 26 may be a database that, in part, determines whether the wireless terminal 12 is authorized to exchange signals with the radio access network 38. Additionally, the AAA 26 may act as a proxy to an AAA server 44 on the enterprise network 34. The AAA server 44 may be a database that determines whether the wireless terminal 12 is authorized to communicate with the resource 36 over the enterprise network 34.

A network services suite (NSS) 28 may be coupled to the IWF 24 and/or the PDSN 18. The NSS may include at least one server that provides value-added services to the wireless terminal 12. The value-added services may include decompression, transcoding, synchronization, or location determination, details of which will be described later. Additionally, the NSS 28 may route the packets to the shared network 40. The NSS 28 may be a Sun Microsystems Netra platform running ByteMobile bandwidth optimization software, but other arrangements are also possible.

A virtual private network (VPN) may securely transport the packets over the shared network 40. The VPN is a secure point-to-point connection over the shared network 40. The VPN may span the shared network 40, between a VPN server 30 and a VPN terminator 32. The VPN server 30 and the VPN terminator 32 may serve as the end-points of the VPN, but other arrangements are also possible. The VPN server 30 and the VPN terminator 32 may be Nortel Shasta 5000 VPN gateways, but other arrangements are also possible.

Figure 2:
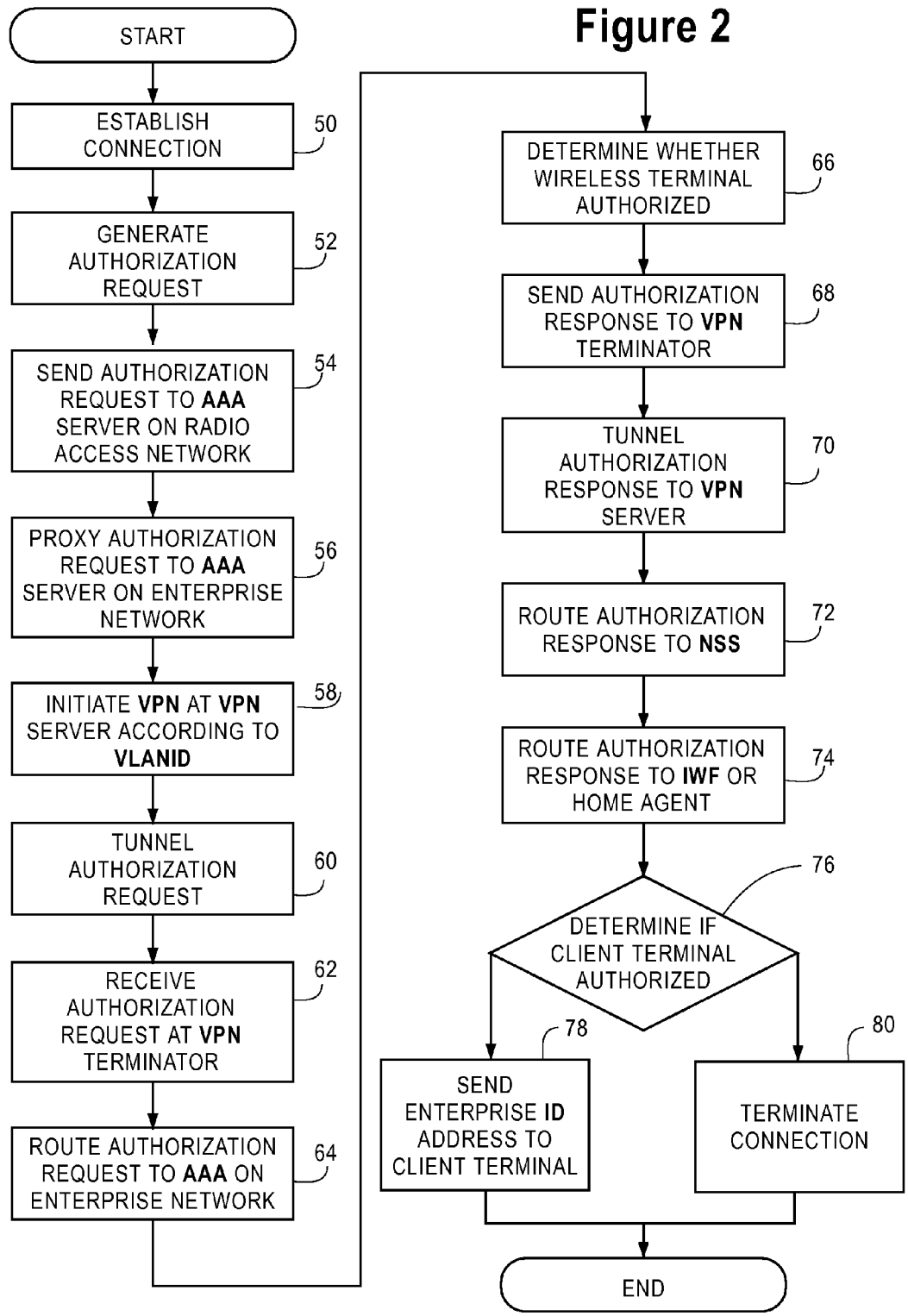
FIG. 2 is a flow chart for establishing a communication session between a wireless terminal and a resource.

Establishing a Communication Session Between the Wireless Terminal and the Resource FIG. 2 is a flow chart that illustrates an exemplary process for establishing a communication session between the wireless terminal 12 and the resource 36. As a result of establishing the communication session, the wireless terminal may communicate with the resource, in part, over a VPN. The VPN may provide secure communication through the shared network 40.

Establishing the communication session may begin at step 50 with the wireless terminal 12 establishing a connection with the radio access network 38. The wireless terminal 12 may establish a point-to-point protocol (PPP), PPP over Ethernet (PPPoE), or bridged connection with the PDSN 18 or the IWF 24.

The wireless terminal 12 may establish the connection with the DWF 24 by sending a string of numbers to the BTS 14 and BSC 16. The string of numbers may be dialed digits that indicate to the MSC 22 that a call is a data connection. Based on the dialed digits, the MSC 22 may hand the call off to the IWF 24. The IWF 24 may then establish the PPP, PPPoE, or bridged connection with the wireless terminal 12.

Alternatively, the wireless terminal 12 may establish a connection with the PDSN 18. The wireless terminal 12 may establish the connection by contacting a home agent or foreign agent. The home agent and/or a foreign agent may be software entities coupled to or resident on the PDSN 18 that authorize the wireless terminal 12 to access the radio access network 38.

If the wireless terminal 12 is within a home network, then the wireless terminal 12 may contact its home agent to establish the connection with the radio access network 38. The wireless terminal 12 may provide the MIN of the wireless terminal 12, for example, to the home agent. Having the MIN, the home agent may query the AAA server 26 using an authentication and accounting protocol such as remote authentication dial in user service (RADIUS). As a result of the query, the AAA server 26 may indicate whether the wireless terminal 12 is authorized to access the radio access network 38. If the wireless terminal 12 is authorized to access the radio access network 38, then the wireless terminal 12 may establish the PPP, PPPoE, or bridged connection with the PDSN 18.

If the wireless terminal 12 is within a foreign network, then the wireless terminal 12 may register its presence with a foreign agent. As part of registration, the wireless terminal 12 may provide the foreign agent with a home address that uniquely identifies its home agent. The wireless terminal 12 may also provide the foreign agent with the MIN. Using the home address, the foreign agent may contact the home agent to authorize the wireless terminal 12. The foreign agent may also send the MIN to the home agent. Using the MIN, the home agent may query the AAA server 26 to determine whether the wireless terminal 12 is authorized to communicate over the radio access network 38. If the AAA server 26 indicates that the wireless terminal 12 is authorized to communicate over the radio access network 38, then the wireless terminal 12 may establish the PPP, PPPoE, or bridged connection with the PDSN 18.

As part of establishing the connection with the IWF 24 or PDSN 18, the wireless terminal 12 may send a network access identifier (NAI), a user name, and a password to the AAA server 44. The NAI may identify the enterprise network 34 to/from which the wireless terminal 12 will send and receive packets. A typical form of an NAI is "@enterprisenetwork.com," where "enterprisenetwork" defines a domain of the enterprise network to which the resource 36 is coupled. The user name and password may indicate to the AAA server 44 whether the user of the wireless terminal 12 is authorized to communicate over the enterprise network 34. Of course, other means of identification and authorization are also possible for indicating that the user is authorized to communicate over the enterprise network 34.

In response to the wireless terminal 12 establishing the connection with the IWF 34 or the PSDN 18, the IWF 34 or the home agent may generate an authorization request at 52. The authorization request may correspond to RADUIS protocol and define the NAI, the user name, and the password that authorize the wireless terminal 12 to communicate with the resource 36. The authorization request may also have a field that identifies a VPN to be established over the shared network 40. The authorization request may take the form of at least one packet, but other arrangements are also possible.

The field that identifies the VPN to be established over the shared network may be a virtual local area network identifier (VLAN ID). VLAN defines a particular level of priority access for the packets carried by the shared network 40. The VLAN ID is a logical identifier that allows for selective switching of the packets to achieve the particular priority level of access. The VLAN ID may be assigned in a manner that it also uniquely identifies the enterprise network 34 and the VPN that will carry the packets between the wireless terminal 12 and the enterprise network 34. The IWF 24 or home agent may insert the VLAN ID into the field of the authorization request. Alternatively, the NSS 28 may insert the VLAN ID into the field of the authorization request. The VPN server 30 may use the VLAN ID to tunnel packets to the VPN terminator 32.

At step 54, the IWF 24 or home agent may send the authorization request to the AAA server 26. The AAA server 26 may identify the enterprise network 34 associated with the NAI and, at step 56, proxy the authorization request to the AAA server 44. The AAA server 26 may proxy the authorization request to the AAA server 44 by including a source address and a destination address in the authorization request. The source address may identify the AAA server 26 and the destination address may identify the AAA server 44, but other arrangements are also possible.

The AAA server 26 may send the authorization request to the NSS 28. The NSS 28 may insert the VLAN ID into the authorization request, if not inserted by the IWF 24 or the home agent, and then forward the authorization request to the VPN server 30.

At step 58, the VPN server 30 may use the VLAN ID to identify the VPN that terminates at the enterprise network 34. IPSec (the entirety of which is herein incorporated by referenced) is an Institute of Electrical and Electronic Engineers (I.E.E.E.) open standard defining various protocols for initiating the VPN over the shared network 40. IPSec, in part, defines a key exchange with the endpoints of the VPN, i.e., the VPN server 30 and the VPN terminator 32. The key defines a type of encryption and a type of decryption to be applied to the packets. The encryption and decryption may conform to triple data encryption standard (3DES), but other arrangements are also possible. The VPN makes for secure communications over the shared network 40, which is an inherently insecure medium.

At step 60, the VPN server 30 may tunnel the authorization request through the shared network 40. The VPN server 30 may tunnel the authorization request by encrypting and encapsulating the authorization request. The VPN server 30 may encrypt the authorization request by using the key obtained as a result of the key exchange. Then, the VPN server 30 may encapsulate the authorization request into a packet having a header with a source address of the VPN server 30 and a destination address of the VPN terminator 32. The VPN server 30 may send the packet through the VPN. The encryption and encapsulation of the packet protects against traffic analysis because only the end points of the VPN, i.e., the VPN server 30 and VPN terminator 32, are visible to the network elements that route the packet.

The shared network 40 may route the packet having the authorization request from the VPN server 30 to the VPN terminator 32. At step 62, the VPN terminator 32 may receive the packet having the authorization request. The VPN terminator 32 may decrypt the packet by applying the key obtained as a result of the key exchange. At step 64, the VPN terminator 32 may use the destination address in the authorization request to route the authorization request to the AAA server 44.

At step 66, the AAA server 44 may use the user name and password in the authorization request to determine whether the wireless terminal 12 is authorized to communicate over the enterprise network 34. The AAA server 44 may, for example, compare the user name and password in the authorization request to a list of valid user names and passwords that are stored on the AAA 44. If the user name and password of the wireless terminal 12 match a valid user name and password, then the wireless terminal 12 may be authorized to communicate over the enterprise network 34. If the user name and password of the wireless terminal 12 do not match a valid user name and password, then the wireless terminal 12 may not be authorized to communicate over the enterprise network 34. Of course, other arrangements are also possible for determining whether the wireless terminal 12 is authorized to communicate over the enterprise network 34.

In response to receiving the authorization request, the AAA server 44 may send an authorization response to the VPN terminator 32 at step 68. The authorization response may indicate whether the wireless terminal 12 is authorized to communicate over the enterprise network 34. The authorization response may have a source address of the AAA server 44 and a destination address of the AAA server 26. At step 70, the VPN terminator 32 may tunnel the authorization response to the VPN server 30.

The VPN server 30 may receive the authorization response and route the authorization response to the NSS 28 at step 72. The NSS 28 may then route the authorization response to the AAA server 26. The AAA server 26 may include RADUIS attributes in the authorization response. For example, the AAA server 26 may include a next-hop IP address in the authorization response. The next-hop IP address may uniquely identify the NSS 26. The AAA server 26 may select the next-hop IP address from a pool of IP addresses that identifies the NSS 26. Alternatively, the IP address may be a single IP address known to the AAA 26 server. The single IP address may uniquely identify the NSS 26. Other arrangements are also possible.

At step 74, the AAA 26 server may route the authorization response to the IWF 24 or the home agent. At step 76, the IWF 24 or the home agent may use the authorization response to determine whether the wireless terminal 12 is authorized to communicate over the enterprise network 34. The authorization response may have a code in the authorization response that indicates whether or not the wireless terminal 12 is authorized to communicate over the enterprise network 34. If the code in the authorization response indicates that the wireless terminal is authorized to communicate over the enterprise network 34, then the authorization response may also include a unique enterprise IP address. The unique enterprise IP address may be a source address that is to be assigned to the wireless terminal 12 and which authorizes the wireless terminal 12 to communicate with the resource 36. At step 78, the IWF 24 or the home agent may send the unique enterprise IP address to the wireless terminal 12. The wireless terminal 12 may use the unique enterprise IP address when sending data to the resource 36 over the enterprise network 34. Additionally, the IWF 24 or the home agent may store the next hop IP address that is in the authorization response.

If the IWF 24 or home agent assigned the VLAN ID to the authorization request, then the IWF 24 or the home agent may associate the enterprise IP address assigned to the wireless terminal 12 with the VLAN ID that uniquely identifies the VPN. For example, the IWF 24 or the home agent may store the enterprise IP address with the VLAN ID. If the NSS 24 assigned the VLAN ID to the authorization request, then the NSS 24 may associate the enterprise IP address with the VLAN ID that uniquely identifies the VPN. Likewise, the NSS 24 may store the enterprise IP address with the VLAN ID. Other variations are also possible.

If the authorization response indicates that the wireless terminal 12 is not authorized to communicate over the enterprise network 34, then the IWF 24 or the home agent may terminate the connection with the wireless terminal 12. The IWF 24 or the home agent may terminate the connection at step 80. The wireless terminal 12 may not be permitted to send data to the enterprise network 34.

Sending Data from the Wireless Terminal to the Resource Through the VPN

Figure 3:
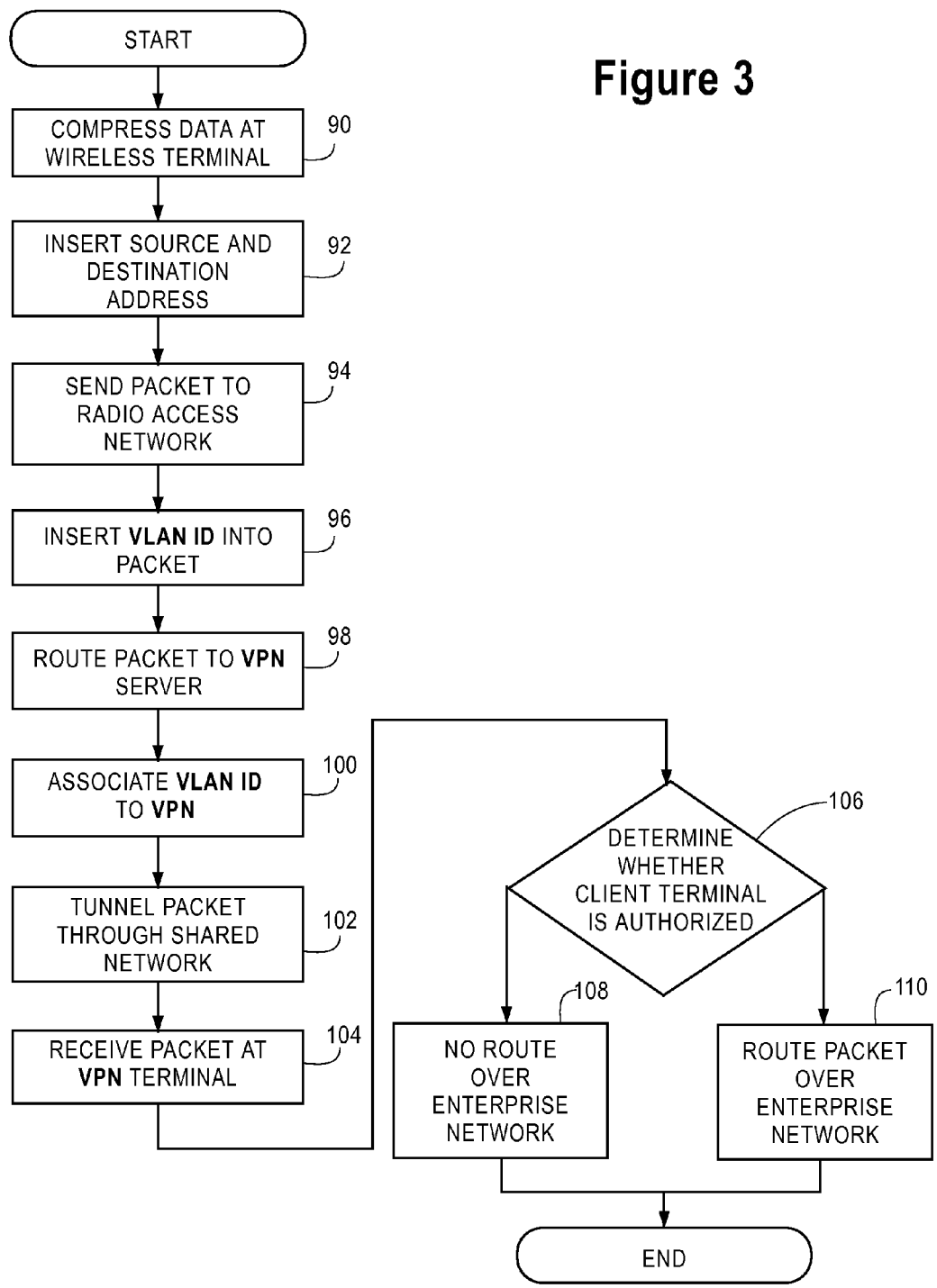
FIG. 3 is a flow chart for sending packets from the wireless terminal, over a VPN, and to the resource.

FIG. 3 is a flow chart that illustrates an exemplary process for sending data from the wireless terminal 12, through both the radio access network 38 and the shared network 40, and to the resource 36. The VPN may securely carry the data over the shared network 40.

The wireless terminal 12 may generate the data, e.g. audio, video, web content, to send to the resource 36. The wireless terminal may additionally compress the data. At step 90, the wireless terminal may use a particular type of compression algorithm suited for the data to be compressed. The data may be compressed so that it is efficiently transported over the air interface 42 and the radio access network 38. The compression algorithm may be joint pictures expert group (JPEG) compression, motion pictures expert group (MPEG) compression, Internet Engineering Task Force (ETF) RFC 1950 "ZLIB Compressed Data Format Specification", IETF RFC 1952 "GZIP File Format Specification", or Microsoft Cabinet File Format (.cab), the entirety of which are herein incorporated by reference. Alternatively, the compression algorithm may be some other type.

At step 92, the wireless terminal 12 may insert a source address and a destination address into the data. The source address may be the enterprise IP address that was sent in the authorization response. The enterprise IP address may authorize the wireless terminal 12 to communicate over the enterprise network 34. The destination address may identify the resource 36 on the enterprise network 34. At step 94, the wireless terminal 12 may send the data over the air interface 42 and to the radio access network 38.

The IWF 24 or home agent may use the enterprise IP address to determine which VPN will carry the packets to the enterprise network 34. As already noted, the enterprise IP address may be stored with the VLAN ID. As a result, the IWF 24 or home agent retrieve the VLAN ID associated with the enterprise IP address. The VLAN ID may uniquely identify the VPN and the enterprise network 34 to which the wireless terminal 12 is authorized to communicate. At step 96, the VLAN ID may be inserted into the packet. Then, at step 98, the packet may be routed to the NSS 28. The IWF 24 or the home agent may route the packet to the NSS 28, for example, by using the next hop IP address. Other arrangements are also possible.

According to an alternative exemplary embodiment of the present invention, the IWF 24 or the home agent may route a packet carrying the data to the NSS 28. The IWF 24 or the home agent may not insert the VLAN ID into the packet.

Instead, the NSS 28 may use the enterprise IP address to determine the VLAN ID that uniquely identifies the VPN. At step 96, the NSS 28 may insert the VLAN ID into the packet.

As already noted, the NSS 26 provides value-added services to the wireless terminal 12. As such, the NSS 26 may manipulate the data carried by the packets. Additionally, the NSS 26 may respond to requests sent by the wireless terminal 12. The NSS 26 may manipulate the data in the packets and respond to requests sent by the wireless terminal 12 because the data is not encrypted until the data is sent over the shared network 40.

For example, the NSS 26 may decompress the data if the wireless terminal 12 compressed the data. The NSS 26 may analyze the payload of the packet or determine from a field in the header of the packet that the data is compressed. If the data is compressed, the NSS 26 may decompress the data and place the data back into the payload of the packet. The NSS 26 may decompress the data based on a type of compression algorithm used to compress the data.

Additionally or alternatively, the NSS 26 may transcode the data to be compatible with the resource 36 that receives the data. The payload or the header may contain a field that identifies a type of resource, e.g., portable computer, desktop computer, to which the data is destined. The packet may also define capabilities of the type of device. Alternatively, the capabilities of the type of device may be stored on the NSS 26. The NSS 26 may alter a format of the data so that the data may be compatible with capabilities of the resource 36. For example, the NSS 26 may convert an image defined by the data from a first resolution to a second resolution (so as to be compatible with a display screen on the resource 36) or convert web content from one markup language, e.g., wireless markup language, to another markup language, e.g., hyper-text markup language, according to an extensible style sheet language (XSL). Other arrangements are also possible.

The NSS 36 may also respond to requests by the wireless terminal 12. Because the data sent by the wireless terminal 12 is unencrypted, the NSS 28 may receive and respond to requests made by the wireless terminal 12.

According to an exemplary embodiment, the wireless terminal 12 may request that the radio access network 36 synchronize content on the wireless terminal 12 with that on the resource 36. For example, the wireless terminal may send a packet over the radio access network 36 which the NSS 28 recognizes as a synchronization request. In response, the NSS 28 may query the wireless terminal 12 and the resource 36 to obtain the content stored on the wireless terminal 12 and the resource 36, respectively. The NSS 28 may compare the contents stored on the wireless terminal with that on the resource 36 and vice-versa. If the contents stored on the resource 36 are not stored in the wireless terminal 12, then the NSS 28 may send the contents to the wireless terminal 12. Likewise, if the contents stored on the wireless terminal 12 are not stored on the resource 36, then the NSS 28 may send the contents to the resource 36. The contents may be sent to the resource and/or the wireless terminal in the form of packets addressed to the respective device, but other arrangements are also possible.

The NSS may use synchronization markup language (SyncML) data synchronization protocol to synchronize the data between the wireless terminal 12 and the resource 36. Sync ML data synchronization is an open industry standard (the entirety of which is herein incorporated by reference) for synchronizing data between networked devices. Of course, other protocols may also be used for synchronizing the contents of the wireless terminal 12 and the resource 36.

According to another exemplary embodiment, the NSS 28 may respond to a location determination by the wireless terminal 12. The location determination may be a request from a wireless terminal 12 to determine its location. In response to the location determination, the NSS 28 may query the wireless terminal 12 (which may know its position based on a global positioning system) or a positioning determining entity (e.g., defined by Standard TIA/EIA/J-STD-036 "Enhanced Wireless 911 Phase 2", the entirety of which is incorporated by reference) in the radio access network 38 for the position of the wireless terminal 12. The NSS 28 may include the position of the wireless terminal 12 in the packet and send the packet to the resource 36.

Interim Standard 801 (TIA/EIA/IS-801) entitled "Position Determination Standard for Dual Mode Spread Spectrum Systems" (the entirety of which is also herein incorporated by reference) also describes various methods for determining mobile terminal position coordinates. One method that is described by IS-801 is Advanced Forward Link Trilateration (A-FLT). A-FLT is a time-synchronized system for determining location of the wireless terminal 12. The MSC 22 may measure the time difference (phase delay) between pairs of signals and convert the time difference into range information based on fixed reference points (e.g., base station). The range data may be used to form curves that intersect at the location of the wireless terminal 12.

The NSS 28 may provide other services in addition to those described here. As noted, the NSS 28 may provide the other value-added services to the wireless terminal 12 because the packets that are exchanged with the wireless terminal 12 and NSS 28 are unencrypted.

At step 98, the NSS 26 may route the packet to the VPN server 30. At step 100, the VPN server 30 may determine the VPN identified by the VLAN ID. At step 102, the VPN server 30 may tunnel the packet through the VPN and to the VPN terminator 32. The VPN server 30 may tunnel the packet by encrypting the packet and encapsulating the packet, as encrypted, into another packet. The header of the packet may have a source address and a destination address. The source address and the destination address may identify the VPN server 30 and the VPN terminator 32, respectively. The VPN server 30 may then send the packet over the shared network 40.

At step 104, the VPN terminator 32 may receive the packet. At step 106, the VPN terminator 32 may determine whether the wireless terminal 12 is authorized to communicate over the enterprise network 34. The VPN terminator 32 may match the source address (i.e., enterprise IP address) of the packet to the addresses in the enterprise pool of IP addresses. As noted above, the enterprise pool of IP addresses may identify wireless terminals authorized to communicate over the enterprise network 34. If the source address matches an address in the enterprise pool, then at step 110, the VPN terminator may route the packet to the resource 36. If the source address does not match an address in the enterprise pool, then the wireless terminal 12 is not authorized to communicate over the enterprise network 34. At step 108, the packet is not routed over the enterprise network 34.

Sending Data from the Enterprise Network to the Wireless Terminal Through the VPN FIG. 4 is a flow chart that illustrates an exemplary process for sending a packet through the VPN from the resource 36 to the wireless terminal 12. Again, the VPN may securely carry the packet over the shared network.

The resource 36 may send a packet to the wireless terminal 12. The packet may have a source address and a destination address to the wireless terminal 12. The source address may be the address of the resource 36. The destination address may be the enterprise IP address assigned to the wireless terminal 12. Alternatively, the destination address may be the home address of the home agent. At step 120, the resource 36 may insert the source and destination addresses into the packet. The resource may send the packet over the enterprise network to the VPN terminator 32 at step 122. At step 124, the VPN terminator 32 may tunnel the packet over the shared network 40 and to the VPN server 30. At step 126, the VPN server 30 may receive the packet from the shared network 40. At step 128, the VPN server 30 may route the packet to the NSS 28. When the NSS 28 receives the packet, the NSS 28 may, in turn, route the packet to the wireless terminal 12 identified by the source address. The NSS 28 may route the packet to the wireless terminal 12 at step 130. The packet may be routed from the NSS 28, to the home agent, and then to the wireless terminal 12. Alternatively, the packet may be routed from the NSS 28, to the IWF 24, and to the wireless terminal 12. Other arrangements are also possible depending on the network architecture.

Exemplary embodiments of the present invention have been described. Those skilled in the art will understand, however, that changes and modifications may be made to these embodiments without departing from the true scope and spirit of the present invention, which is defined by the following claims.

We claim:

1. A system comprising:
    A shared network;
    a radio access network, the radio access network including a base transceiver station (BTS) for communicating with a wireless terminal over an air interface and a packet data serving node (PDSN) for routing packets between the wireless terminal and the shared network;
    an enterprise network;
    a resource on the enterprise network, wherein the wireless terminal and the resource are able to engage in packet communication over a communication pathway, the communication pathway extending through the radio access network, the shared network, and the enterprise network;
    a VPN server in the communication pathway;
    a VPN terminator in the communication pathway, wherein the VPN server and the VPN terminator are able to establish a VPN connection between them through the shared network, the VPN connection providing part of the communication pathway; and
    a network services platform in the communication pathway between the PDSN and the VPN server, wherein the network services platform is able to manipulate data carried in packets exchanged between the wireless terminal and the resource to provide at least one communication service, wherein the at least one communication service comprises a transcoding service in which the network services platform transcodes data transmitted by the wireless terminal into a format compatible with a capability of the resource indicated by the wireless terminal.

2. The system of claim 1, wherein the wireless terminal identifies a resource type and the network services platform determines the capability of the resource from the resource type.

3. The system of claim 1, wherein the at lest one communication service comprises a decompression service in which the wireless terminal transmits compressed data to communicate with the resource and the network services platform decompresses the compressed data.

4. The system of claim 1, wherein the at least one communication service comprises an image conversion service in which the network services platform converts an image from a first resolution to a second resolution.

5. The system of claim 1, wherein the at least one communication service comprises a web content conversion service in which the network services platform converts web content from one markup language to another markup language.

6. The system of claim 1, wherein the network services platform is able to respond to a request sent by the wireless terminal.

7. The system of claim 6, wherein the request is a synchronization request, and wherein the network services platform responds to the synchronization request by synchronizing data stored on the wireless terminal with data stored on the resource.

8. The system of claim 6, wherein the request is a location determination request, and wherein the network services platform responds to the location determination request by determining a location of the wireless terminal.

9. A method comprising:
    establishing a VPN connection through a shared network between a VPN server and a VPN terminator for packet communication between a wireless terminal and a resource on an enterprise network;
    the wireless terminal transmitting a packet to a radio access network over an air interface;
    a packet entity in the radio access network routing the packet to a network services platform;
    the network services platform manipulating data in the packet to provide at least one communication service, wherein the at least one communication service comprises a transcoding service in which the network services platform transcodes the data in the packet into a format that is compatible with a capability of the resource as indicated by the wireless terminal;
    after manipulating the data in the packet, the network services platform sending the packet to the VPN server;
    the VPN server tunneling the packet through the VPN connection to the VPN terminator; and
    the VPN terminator receiving the packet and routing the packet to the resource over the enterprise network.

10. The method of claim 9, further comprising:
    the wireless terminal identifying a resource type; and
    the network services platform determining the capability of the resource from the resource type.

11. The method of claim 9, wherein the packet includes an enterprise address that indicates the wireless terminal is authorized to communicate over the enterprise network.

12. The method of claim 11, wherein the enterprise address is an Internet Protocol (IP) address.

13. The method of claim 12, wherein the enterprise address is a source address of the packet.

14. The method of claim 13, further comprising:
    determining from the enterprise address in the packet that the wireless terminal is authorized to communicate over the enterprise network.

15. The method of claim 14, wherein determining from the enterprise address in the packet that the wireless terminal is authorized to communicate over the enterprise network comprises:
    the VPN terminator determining that the source address of the packet matches an IP address in a pool of IP addresses.

16. The method of claim 11, further comprising: inserting a VLAN ID into the packet, wherein the VLAN ID identifies the VPN connection; and the VPN server determining the VPN connection identified by the VLAN ID.

17. The method of claim 16, wherein the packet entity inserts the VLAN ID into the packet, further comprising:

the packet entity using the enterprise address to determine the VLAN ID.

18. The method of claim 16, wherein the packet entity inserts the VLAN ID into the packet, further comprising:

the network services platform using the enterprise address to determine the VLAN ID.

19. The method of claim 9, wherein the at least one communication service comprises a decompression service in which the network services platform decompresses the data in the packet.

20. The method of claim 9, wherein the packet entity is an interworking function (IWF).

* * * * *